(12) United States Patent
Sasabayashi et al.

(10) Patent No.: US 7,796,373 B2
(45) Date of Patent: Sep. 14, 2010

(54) DIELECTRIC CERAMIC AND MONOLITHIC CERAMIC CAPACITOR

(75) Inventors: Takehisa Sasabayashi, Echizen (JP);
Tomoyuki Nakamura, Moriyama (JP);
Takayuki Yao, Higashiomi (JP);
Masayuki Ishihara, Yasu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 12/548,230

(22) Filed: Aug. 26, 2009

(65) Prior Publication Data

US 2009/0310279 A1    Dec. 17, 2009

Related U.S. Application Data

(63) Continuation of application No. PCT/JP2008/052440, filed on Feb. 14, 2008.

(30) Foreign Application Priority Data

Feb. 26, 2007  (JP) ............................. 2007-045202

(51) Int. Cl.
*H01G 4/06* (2006.01)
*C04B 35/00* (2006.01)

(52) U.S. Cl. ................ 361/321.4; 361/321.5; 29/25.42; 501/139

(58) Field of Classification Search ................ 361/311, 361/321.1, 321.2, 321.3, 321.4, 321.5; 501/138–139; 29/25.42
See application file for complete search history.

(56) References Cited

U.S. PATENT DOCUMENTS

| 6,331,932 | B1 | 12/2001 | Kobayashi et al. |
| 2004/0145856 | A1* | 7/2004 | Nakamura et al. ........... 361/311 |
| 2006/0264317 | A1* | 11/2006 | Banno ........................ 501/138 |
| 2007/0232480 | A1* | 10/2007 | Yanagida et al. ............ 501/139 |

FOREIGN PATENT DOCUMENTS

| JP | 2000223351 | 8/2000 |
| JP | 2001220224 | 8/2001 |
| JP | 2004-224653 A | 8/2004 |

* cited by examiner

*Primary Examiner*—Eric Thomas
(74) *Attorney, Agent, or Firm*—Dickstein Shapiro LLP

(57) ABSTRACT

A dielectric ceramic represented by a general formula: $100Ba_mTiO_3 + aRO_n + bMO_v + cXO_w$ (where R represents a rare earth element, M represents a predetermined metal element, and n, v, and w represent independently a positive number determined in accordance with the valences of the elements R and M and a sintering aid component X, respectively), and the solid solution regions of the secondary components in the main phase grains are 10% or less (including 0%) on average in terms of a cross-sectional area ratio. The sintering aid component X contains at least Si, and m, a, b, and c satisfy $0.995 \leq m \leq 1.030$, $0.1 \leq a \leq 2.0$, $0.1 \leq b \leq 3.0$, and $0.1 \leq c \leq 5.0$. In a monolithic ceramic capacitor, dielectric layers are formed from the above-described dielectric ceramic. Consequently, a dielectric ceramic having a good AC voltage characteristic, maintaining a desired large dielectric constant and a good temperature characteristic, exhibiting a small dielectric loss, and being capable of ensuring the reliability and a monolithic ceramic capacitor including the dielectric ceramic are realized.

15 Claims, 1 Drawing Sheet

DIELECTRIC CERAMIC AND MONOLITHIC CERAMIC CAPACITOR

This is a continuation of application Serial No. PCT/JP2008/052440, filed Feb. 14, 2008, the contents of which are incorporated herein by reference.

TECHNICAL FIELD

The present invention relates to a dielectric ceramic and a monolithic ceramic capacitor. In particular, the present invention relates to a dielectric ceramic suitable for a dielectric material of a small, high-capacity monolithic ceramic capacitor and a monolithic ceramic capacitor produced by using the dielectric ceramic.

BACKGROUND ART

A monolithic ceramic capacitor is an electronic component used for circuits of a wide variety of electronic devices, and along with miniaturization of the electronic devices, miniaturization of the monolithic ceramic capacitor has been required.

The monolithic ceramic capacitor is produced by laminating units in which an internal electrode is interposed between one dielectric layer and another dielectric layer and sintering the laminate. In order to miniaturize the monolithic ceramic capacitor without reducing the capacity of the monolithic ceramic capacitor, it is necessary that the dielectric layers are made thinner.

However, if the dielectric layer is made thinner, a voltage with high field strength is applied to the dielectric layer. Therefore, in some cases, reduction of dielectric constant and deterioration of temperature characteristic may occur and a high-temperature load life may be reduced, so that deterioration of reliability may occur.

Consequently, it is necessary to realize a dielectric ceramic having a large dielectric constant and good temperature characteristic and exhibiting excellent reliability even when a voltage with high field strength is applied because of reduction in thickness of the dielectric layer.

Accordingly, a dielectric ceramic having a composition, which includes a primary component composed of a perovskite compound represented by $ABO_3$ (where A represents Ba and Ca, or Ba, Ca, and Sr, B represents at least one type of Ti, Ti and Zr, and Hf) and an additive component containing Si, a predetermined rare earth element R, and a predetermined metal element M, and including crystal grains and crystal grain boundaries present between crystal grains, has been hitherto proposed, wherein the above-described additive component is not contained as a solid solution, and the above-described primary component is present, in regions of 90% or more of the cross-sections of crystal grains constituting 85% or more, on the number basis, of the above-described crystal grains, and wherein at least the above-described Ba, Ca, Ti, Si, R, and M are contained in analytical points constituting 85% or more, on the number basis, of analytical points at the above-described crystal grain boundaries (Patent Document 1).

In Patent Document 1, it is intended that a high-temperature load life is ensured by including $(Ba,Ca)TiO_3$ as a primary component and Si, a predetermined rare earth element R, and a predetermined metal element M as secondary components, and allowing the above-described secondary components to present at crystal grain boundaries while forming almost no solid solution with the primary component and, thereby, the reliability is improved.

Patent Document 1: Japanese Unexamined Patent Application Publication No. 2004-224653

DISCLOSURE OF INVENTION

Problems to be Solved by the Invention

However, in the case where the dielectric ceramic in Patent Document 1 is used in a thin layer monolithic ceramic capacitor, there is a problem in that a large fluctuation of capacitance occurs with respect to an applied electric field.

About 0.1 to 0.5 V of alternating current voltage is usually applied to the monolithic ceramic capacitor. However, in some cases, the amplitude of the alternating current voltage fluctuates depending on the recent circumstances of usage. Consequently, there is a problem in that the capacitance is fluctuated significantly and the alternating current voltage characteristic (hereafter referred to as "AC voltage characteristic") deteriorates.

The present invention has been made in consideration of the above-described problems. Accordingly, it is an object of the present invention to provide a dielectric ceramic having a good AC voltage characteristic, maintaining a desired large dielectric constant and a good temperature characteristic, exhibiting a small dielectric loss, and being capable of ensuring the reliability and a monolithic ceramic capacitor including the dielectric ceramic.

Means for Solving the Problems

The present inventors produced a dielectric ceramic by using substantially Ca-free $BaTiO_3$ as a primary component and adding substantially the same secondary components as those in Patent Document 1 and examined the relationship between the ceramic microstructure and the AC voltage characteristic. As a result, it was found that the AC voltage characteristic could be improved by specifying the solid solution regions of the secondary components in the main phase grains to be 10% or less on average in terms of a cross-sectional area ratio.

The present invention has been made on the basis of the above-described findings. A dielectric ceramic according to the present invention is characterized by having a composition including barium titanate as a primary component and a first additive element R composed of at least one member selected from the group consisting of La, Ce, Pr, Nd, Sm, Eu, Gd, Tb, Dy, Ho, Er, Tm, Yb, Lu, and Y, a second additive element M composed of at least one member selected from the group consisting of Mn, Fe, Co, V, W, Cr, Mo, Cu, Al, and Mg, and a sintering aid component X containing at least Si as secondary components, wherein the solid solution regions of the above-described secondary components in the main phase grains are 10% or less (including 0%) on average in terms of a cross-sectional area ratio.

Furthermore, as a result of intensive research further conducted by the present inventors, it was also made clear that a desired large dielectric constant and a good temperature characteristic were able to be maintained and good reliability was able to be ensured by adjusting the amounts of addition of the individual secondary components added to a primary component, $BaTiO_3$.

That is, the dielectric ceramic according to the present invention is characterized in that the above-described composition is represented by a general formula: $100Ba_mTiO_3 + aRO_n + bMO_v + cXO_w$ (where n, v, and w represent independently a positive number determined in accordance with the valences of the above-described first additive element R, the above-described second additive element M, and the above-described sintering aid component X, respectively) and m, a, b, and c described above satisfy $0.995 \leq m \leq 1.030$, $0.1 \leq a \leq 2.0$, $0.1 \leq b \leq 3.0$, and $0.1 \leq c \leq 5.0$, respectively.

Moreover, a monolithic ceramic capacitor according to the present invention is characterized by including a ceramic sintered member in which dielectric layers and internal electrodes are laminated alternately, external electrodes are disposed on both end portions of the ceramic sintered member, and the external electrodes are electrically connected to the above-described internal electrodes, wherein the above-described dielectric layer is formed from the above-described dielectric ceramic.

ADVANTAGES

The dielectric ceramic according to the present invention has a composition including barium titanate as the primary component and the first additive element R, e.g., La and Ce, the second additive element M, e.g., Mn and Fe, and the sintering aid containing at least Si as secondary components, wherein the solid solution regions of the above-described secondary components in the main phase grains are 10% or less (including 0%) on average in terms of a cross-sectional area ratio. Therefore, the dielectric ceramic having a good AC voltage characteristic can be obtained, wherein the capacitance is stable even when the amplitude of the applied AC voltage fluctuates.

Furthermore, the above-described composition is represented by the general formula: $100Ba_mTiO_3+aRO_n+bMO_v+cXO_w$ and m, a, b, and c described above satisfy $0.995 \leq m \leq 1.030$, $0.1 \leq a \leq 2.0$, $0.1 \leq b \leq 3.0$, and $0.1 \leq c \leq 5.0$, respectively. Therefore, a dielectric ceramic having a good AC voltage characteristic, being capable of maintaining a desired large dielectric constant and a good temperature characteristic, exhibiting a small dielectric loss, and being capable of ensuring the reliability can be obtained.

Moreover, the monolithic ceramic capacitor according to the present invention includes a ceramic sintered member in which dielectric layers and internal electrodes are laminated alternately, external electrodes are disposed on both end portions of the ceramic sintered member, and the external electrodes are electrically connected to the above-described internal electrodes, wherein the above-described dielectric layer is formed from the above-described dielectric ceramic. Therefore, the monolithic ceramic capacitor having the capacitance stable toward fluctuation of AC voltage, being capable of maintaining a desired large dielectric constant and a good temperature characteristic, exhibiting a small dielectric loss, and being capable of ensuring the reliability can be obtained.

Specifically, the monolithic ceramic capacitor exhibiting a rate of change in capacitance with respect to the voltage within $\pm 10\%$, having a good dielectric characteristic in such a way that the dielectric constant $\in$ is 2,500 or more and the dielectric loss tan $\delta$ is less than 5%, having a capacitance temperature characteristic satisfying that the rate of change in capacitance at $-55°$ C. to $+85°$ C. is within $\pm 10\%$ with reference to the capacitance at $25°$ C., and exhibiting excellent reliability without reduction of the high-temperature load life can be obtained.

Figure 1:
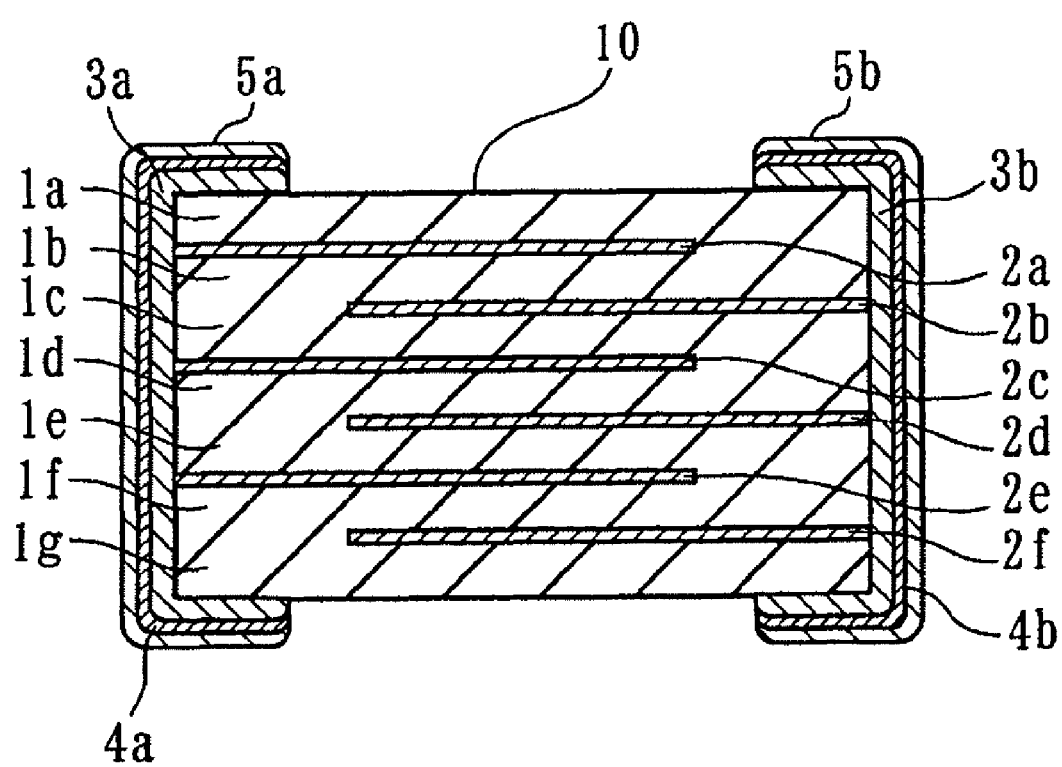
FIG. 1 is a sectional view showing an embodiment of a monolithic ceramic capacitor produced by using a dielectric ceramic according to the present invention.

REFERENCE NUMERALS 1a to 1g dielectric layer
2a to 2f internal electrode
3a, 3b external electrode
10 ceramic sintered member

BEST MODES FOR CARRYING OUT THE INVENTION

The embodiment according to the present invention will be described below in detail.

A dielectric ceramic according to the present invention has a composition represented by the following general formula (A).

$$100Ba_mTiO_3+aRO_n+bMO_v+cXO_w \qquad (A)$$

That is, the present dielectric ceramic has a composition including a substantially calcium-free barium titanate as a primary component and an R oxide $RO_n$ containing a first additive element R, an M oxide $MO_v$ containing a second additive element M, and a sintering aid component $XO_w$ as secondary components.

Here, the first additive element R is composed of at least one member selected from the group consisting of La, Ce, Pr, Nd, Sm, Eu, Gd, Tb, Dy, Ho, Er, Tm, Yb, Lu, and Y. The second additive element M is composed of at least one member selected from the group consisting of Mn, Fe, Co, V, W, Cr, Mo, Cu, Al, and Mg.

Furthermore, in the general formula (A), v is a positive number determined in accordance with the valence of the second additive element M. For example, in the case where the second additive element M is divalent Mn, v is 1 and in the case where M is pentavalent V, v is 5/2.

Likewise, w is a positive number univocally determined in accordance with the valence of the sintering aid component X. For example, in the case where X is tetravalent Si, w is 2.

Moreover, the sintering aid component X contains at least Si. However, Ti, Li, Na, B, Al, Ga, K, Zr, Ba, Sr, and the like, in addition to Si, can be appropriately selectively used, as necessary.

In addition, in the present embodiment, reactions between the primary component and the secondary components are minimized by adjusting the grain size of $Ba_mTiO_3$ in the production process and, thereby, the solid solution regions of the secondary components in the main phase grains are specified to be 10% or less (including 0%) on average in terms of a cross-sectional area ratio.

Consequently, a dielectric ceramic having a good AC voltage characteristic can be obtained, wherein the rate of change in capacitance with respect to the voltage can be suppressed even when the amplitude of the applied AC voltage fluctuates.

Furthermore, from the viewpoint of making the AC voltage characteristic good, making the dielectric characteristic and the temperature characteristic good, and ensuring the reliability, as described above, preferably, the amounts of blend of the primary component and the secondary components is adjusted in such a way that m, a, b, and c in the above-described general formula (A) satisfy the following mathematical expressions (1) to (4).

$$0.995 \leq m \leq 1.030 \qquad (1)$$

$$0.1 \leq a \leq 2.0 \qquad (2)$$

$$0.1 \leq b \leq 3.0 \qquad (3)$$

$$0.1 \leq c \leq 5.0 \qquad (4)$$

The reason for specifying m, a, b, and c in such a way as to satisfy the mathematical expressions (1) to (4) will be described below.

(1) m

The ratio of the Ba site to the Ti site of barium titanate serving as a primary component is specified to be m, and m is stoichiometrically 1.000. However, the blend ratio of Ba compound to Ti compound may be adjusted in such a way that the Ba site becomes excessive or the Ti site becomes excessive, as necessary.

However, if the blend molar ratio m is less than 0.995, the Ti site in the composition of the main component is too excessive. Consequently, the dielectric loss tan δ increases and, furthermore, the high-temperature load life is reduced, so that the reliability may deteriorate. On the other hand, if the blend molar ratio m exceeds 1.030, the composition of the main component has an excessive Ba site. Consequently, the dielectric constant ∈ may be reduced.

Therefore, it is preferable that the blend molar ratio m satisfies $0.995 \leq m \leq 1.030$ from the viewpoint of ensuring the dielectric characteristic, the reliability, and the like.

(2) a

Addition of the first additive element R to the primary component can reduce the dielectric loss tan δ and contributes to improvement of the reliability.

However, if the amount of moles of contained first additive element R is less than 0.1 parts by mole relative to 100 parts by mole of primary component, the desired effect of addition cannot be obtained. On the other hand, if the amount of moles of contained first additive element R exceeds 2.0 parts by mole relative to 100 parts by mole of primary component, a reduction of dielectric constant ∈ may be realized and the temperature characteristic of capacitance may deteriorate.

Therefore, it is preferable that the parts by mole a of the first additive element R relative to 100 parts by mole of primary component satisfies $0.1 \leq a \leq 2.0$.

(3) b

Addition of the second additive element M to the primary component can suppress the dielectric loss tan δ and contributes to the improvement of the reliability in a manner similar to the first additive element R.

However, if the amount of moles of contained second additive element M is less than 0.1 parts by mole relative to 100 parts by mole of primary component, the desired effect of addition cannot be obtained. On the other hand, if the amount of moles of contained second additive element M exceeds 3.0 parts by mole relative to 100 parts by mole of primary component, a reduction of dielectric constant ∈ may occur and the temperature characteristic of capacitance may deteriorate.

Therefore, it is preferable that the parts by mole b of the second additive element M relative to 100 parts by mole of primary component satisfies $0.1 \leq a \leq 3.0$.

(4) c

Addition of an appropriate amount of sintering aid to the primary component can improve the sinterability and contribute to low-temperature firing and, in addition, various characteristics of the dielectric ceramic can be improved.

However, if the amount of moles of contained sintering aid component X is less than 0.1 parts by mole relative to 100 parts by mole of primary component, the desired effect of addition cannot be obtained, the dielectric constant ∈ is low, the temperature characteristic of capacitance deteriorates, the high-temperature load life is reduced and, thereby, the reliability may be impaired. On the other hand, if the amount of moles of contained sintering aid component X exceeds 5.0 relative to 100 parts by mole of primary component, deterioration of the reliability may occur and the dielectric loss tan δ increases.

Therefore, it is preferable that the parts by mole c of the sintering aid component X relative to 100 parts by mole of primary component satisfies $0.1 \leq c \leq 5.0$.

As described above, in the case where the dielectric ceramic represented by the above-described general formula (A) satisfies the above-described mathematical expressions (1) to (4), a dielectric ceramic having a good AC voltage characteristic, being capable of maintaining a desired large dielectric constant and a good temperature characteristic, exhibiting a small dielectric loss, and being capable of ensuring the reliability can be obtained.

Next, a monolithic ceramic capacitor produced by using the present dielectric ceramic will be described in detail.

FIG. 1 is a sectional view schematically showing an embodiment of the above-described monolithic ceramic capacitor.

In the monolithic ceramic capacitor, internal electrodes 2a to 2f are embedded in a ceramic sintered member 10, external electrodes 3a and 3b are disposed on both end portions of the ceramic sintered member 10, and first plating films 4a and 4b and second plating films 5a and 5b are disposed on the surfaces of the external electrodes 3a and 3b.

That is, the ceramic sintered member 10 is produced by laminating dielectric layers 1a to 1g formed from the dielectric ceramic according to the present invention and internal electrode layers 2a to 2f alternately and conducting firing. The internal electrode layers 2a, 2c, and 2e are electrically connected to the external electrode 3a, and the internal electrode layers 2b, 2d, and 2f are electrically connected to the external electrode 3b. Furthermore, the capacitance is formed between opposite surfaces of the internal electrode layers 2a, 2c, and 2e and the internal electrode layers 2b, 2d, and 2f.

Next, a method for manufacturing the above-described monolithic ceramic capacitor will be described in detail.

Initially, a Ba compound, e.g., $BaCO_3$, and a Ti compound, e.g., $TiO_2$, are prepared as ceramic raw materials. The above-described ceramic raw materials are weighed in such a way that the blend molar ratio m of the Ba site to the Ti site becomes within the range of 0.995 to 1.030.

Subsequently, the resulting weighed materials are put into a ball mill together with media, e.g., PSZ (partially stabilized zirconia) balls, and pure water, and wet mixing and pulverization are conducted sufficiently. Thereafter, a calcination treatment is conducted at a temperature of 1,000° C. or higher, so that a calcined powder composed of particulate, highly crystalline $Ba_mTiO_3$ is produced.

Next, small diameter mill media having diameters 1,000 times the average particle diameter of the resulting calcined powder or smaller (hereafter referred to as "small media") are prepared. Subsequently, the above-described calcined powder is put into the ball mill together with the above-described small media and pure water so as to wet-disintegrate the above-described calcined powder and obtain a slurry. In this regard, the small media are used in this disintegration treatment in order to minimize damage to the above-described calcined powder, because this treatment is for the purpose of disintegrating the above-described calcined powder.

Then, the above-described slurry is subjected to a classification treatment by using a filter, e.g., a nonwoven fabric filter, so as to remove very fine $Ba_mTiO_3$ particles which are about one tenth of the titanate average particle diameter in the slurry or smaller, followed by drying. Consequently, a particulate, highly crystalline primary component powder, from which very fine $Ba_mTiO_3$ particles have been removed as much as possible, is obtained.

As described above, the very fine $BaTiO_3$ particles are removed from the primary component as much as possible on the following grounds.

It is preferable that the primary component is fine particles for the purpose of reducing the thickness of the dielectric layer. However, if large amounts of very fine $BaTiO_3$ particles are present in the primary component, secondary components, which will be described later, react with the above-described very fine $BaTiO_3$ particles and, as a result, the region of solid solution of the secondary components with the primary component increases and the solid solution regions of the secondary components in the main phase grains may exceed 10% on average in terms of a cross-sectional area ratio.

Therefore, in the present embodiment, the classification treatment is conducted in advance and, thereby, presence of very fine $Ba_mTiO_3$ particles in the primary component is minimized.

Subsequently, $RO_n$ containing the first additive element R, $MO_v$ containing the second additive element M, and the sintering aid $XO_w$ containing at least Si are prepared as the secondary components. These secondary component materials are mixed with the above-described primary component powder in the ball mill and, thereafter, vaporization and drying are conducted, so as to obtain a ceramic raw material powder.

Next, the above-described ceramic raw material powder is put into the ball mill together with an organic binder and an organic solvent and wet mixing is conducted, so that a ceramic slurry is produced. Thereafter, the ceramic slurry is subjected to shaping by a rip method or the like, so as to produce ceramic green sheets.

Then, screen printing is conducted on the ceramic green sheet by using an electrically conductive paste for an internal electrode, so that an electrically conductive film with a predetermined pattern is formed on the surface of the above-described ceramic green sheet.

In this regard, it is preferable that a base metal material containing Ni, Cu, or an alloy thereof as a primary component is used as the electrically conductive material contained in the electrically conductive paste for an internal electrode from the viewpoint of cost reduction.

Subsequently, a plurality of ceramic green sheets provided with the electrically conductive films are laminated in a predetermined direction, held between ceramic green sheets provided with no electrically conductive film, contact-bonded, and cut into a predetermined dimension, so that a ceramic laminate is produced. Thereafter, a binder removal treatment is conducted at a temperature of 300° C. to 500° C., and a firing treatment is further conducted at a temperature of 1,000° C. to 1,200° C. for about 2 hours in a reducing atmosphere composed of a $H_2$—$N_2$—$H_2O$ gas while the oxygen partial pressure is controlled at $10^{-9}$ to $10^{-12}$ MPa. Consequently, the electrically conductive films and the ceramic green sheets are co-sintered and, thereby, the ceramic sintered member 10 in which the internal electrode layers 2a to 2f and the dielectric layers 1a to 1g are laminated alternately is obtained.

In this regard, $BaTiO_3$ serving as the primary component is present as fine particles but, as described above, very fine $Ba_mTiO_3$ particles are removed as much as possible. Therefore, in this firing step, the reactions between the primary component and the secondary components are suppressed and, thereby, the solid solution regions of the secondary components in the main phase grains are reduced to 10% or less on average in terms of a cross-sectional area ratio.

Next, both end surfaces of the ceramic sintered member 10 are coated with an electrically conductive paste for an external electrode, and a baking treatment is conducted, so that the external electrodes 3a and 3b are formed.

Regarding an electrically conductive material contained in the electrically conductive paste for an external electrode as well, it is preferable that a base metal material containing Ni, Cu, or an alloy thereof as a primary component is used from the viewpoint of cost reduction.

As for a method for forming the external electrodes 3a and 3b, after both end surfaces of the ceramic laminate are coated with the electrically conductive paste for an external electrode, a firing treatment may be conducted together with the ceramic laminate.

Finally, electroplating is conducted so as to form first coating films 4a and 4b composed of Ni, Cu, a Ni—Cu alloy, or the like on the surfaces of the external electrodes 3a and 3b. Furthermore, second plating films 5a and 5b composed of solder, tin, or the like are formed on the surfaces of the first plating films 4a and 4b, so that the monolithic ceramic capacitor is produced.

As described above, in the present monolithic ceramic capacitor, the dielectric layers 1a to 1g are produced by using the above-described dielectric ceramic. Therefore, a good AC voltage characteristic can be ensured even when the dielectric layers 1a to 1g are made thinner. In addition, a monolithic ceramic capacitor having a good high-temperature load life and exhibiting excellent reliability can be obtained without impairing the dielectric characteristic and the temperature characteristic.

Specifically, a monolithic ceramic capacitor exhibiting excellent reliability can be obtained, wherein regarding the AC voltage characteristic of capacitance, in the case where an effective voltage of 0.5 Vrms is employed as the reference, the rate of change in capacitance is within ±10% at an effective voltage of 0.1 Vrms, the dielectric constant $\in$ is 2,500 or more and is a high dielectric constant, the dielectric loss tan δ is less than 5%, regarding the capacitance temperature characteristic, the rate of change in capacitance at −55° C. to +85° C. is within ±10% with reference to the capacitance at 25° C., and the durability is 2,000 hours or more at a high temperature of 85° C.

Incidentally, the present invention is not limited to the above-described embodiment. For example, in the production process of the above-described monolithic ceramic capacitor, Zr, Ni, Ag, Na, Pd, Zn, Hf, Sr, and the like may be present as impurities and be present in crystal grains and crystal grain boundaries. However, the electrical characteristics of the monolithic ceramic capacitor are not affected.

Furthermore, in the firing treatment of the monolithic ceramic capacitor, the internal electrode components may diffuse into crystal grains and crystal grain boundaries. However, in this case as well, no influence is exerted on the electrical characteristics of the monolithic ceramic capacitor.

Moreover, in the above-described embodiment, $Ba_mTiO_3$ serving as the primary component is produced by a solid phase synthesis method in which the Ba compound and the Ti compound are used as the starting raw materials. However, production may be conducted by a hydrolysis method, a hydrothermal synthesis method, a coprecipitation method, or the like. In addition, as for the Ba compound and the Ti compound, nitrates, hydroxides, organic acid salts, alkoxides, chelate compounds, and the like, besides carbonates and oxides, can be selected appropriately in accordance with the form of the synthesis reaction.

Some examples according to the present invention will be specifically described below.

Example 1

In Example 1, monolithic ceramic capacitors of Sample Nos. 1 to 8 were produced, in which the cross-sectional area ratios of the solid solution regions of the secondary components in the main phase grains were different, and the dielectric characteristic, the AC voltage characteristic, the temperature characteristic, and the reliability were evaluated.

Production of Sample

Sample Nos. 1 to 4

Initially, $BaCO_3$ and $TiO_2$ were prepared as ceramic raw materials. The above-described ceramic raw materials were weighed in such a way that the blend molar ratio m of Ba to Ti became 1.008.

Subsequently, the resulting weighed materials were put into a ball mill together with PSZ balls and pure water, and wet mixing and pulverization were conducted sufficiently. Thereafter, a calcination treatment was conducted at a temperature of 1,000° C. or higher, so that a calcined powder composed of $Ba_{1.008}TiO_3$ having an average particle diameter of 0.2 μm was produced.

Next, small diameter PSZ balls having a diameter of 0.1 mm were prepared. Subsequently, the above-described calcined powder was put into the ball mill together with the small diameter PSZ balls and pure water. A wet disintegration treatment was conducted for 8 to 18 hours so as to obtain a slurry. Then, the resulting slurry was subjected to a classification treatment by using a nonwoven fabric filter. The particle size distribution of the slurry after the classification was measured and, thereby, it was ascertained that very fine $Ba_{1.008}TiO_3$ particles of 0.02 μm or less were removed.

Thereafter, the above-described slurry after the classification was dried, so that a primary component powder composed of $Ba_{1.008}TiO_3$ was obtained.

Subsequently, $Dy_2O_3$, MgO, MnO, and $SiO_2$ were prepared as secondary component materials. These secondary component materials were weighed in such a way that the dielectric ceramic satisfied the following general formula (B).

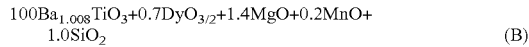

$$100Ba_{1.008}TiO_3 + 0.7DyO_{3/2} + 1.4MgO + 0.2MnO + 1.0SiO_2 \quad (B)$$

These secondary component materials were mixed with the above-described primary component powder in the ball mill and, thereafter, vaporization and drying were conducted, so as to obtain a ceramic raw material powder.

Next, the resulting ceramic raw material powder was blended with a polyvinyl butyral based binder serving as an organic binder and ethanol serving as an organic solvent and the mixture was put into the ball mill. Wet mixing was conducted for a predetermined time, so that a ceramic slurry was produced. Thereafter, the resulting ceramic slurry was shaped into a sheet by using a rip method, so as to produce ceramic green sheets.

Then, an electrically conductive paste for an internal electrode containing Ni as a primary component was prepared. Screen printing was conducted by applying the electrically conductive paste for an internal electrode on the above-described ceramic green sheet, so that an electrically conductive film with a predetermined pattern was formed on the surface of the above-described ceramic green sheet.

Subsequently, a plurality of ceramic green sheets provided with the electrically conductive films were laminated in a predetermined direction, held between ceramic green sheets provided with no electrically conductive film, contact-bonded, and cut into a predetermined dimension, so that a ceramic laminate was produced. Thereafter, a binder removal treatment was conducted at a temperature of 300° C., and a firing treatment was further conducted at a temperature of 1,200° C. for about 2 hours in a reducing atmosphere composed of a $H_2$—$N_2$—$H_2O$ gas while the oxygen partial pressure was controlled at $10^{-10}$ MPa. Consequently, a ceramic sintered member was obtained, in which the dielectric layers and the internal electrodes were laminated alternately.

Next, an electrically conductive paste for an external electrode primarily containing Cu including $B_2O_3$—$Li_2O$—$SiO_2$—BaO based glass component was prepared. Subsequently, both end surfaces of the above-described ceramic sintered member were coated with the above-described electrically conductive paste for an external electrode, and a baking treatment was conducted at a temperature of 800° C. in a $N_2$ atmosphere, so that the external electrodes electrically connected to the internal electrodes were formed. In this manner, monolithic ceramic capacitors of Sample Nos. 1 to 4 were produced.

The resulting monolithic ceramic capacitor had outside dimensions of length: 2.0 mm, width: 1.2 mm, and thickness: mm, and the thickness of the dielectric layer was 1.0 μm per layer. The total number of effective dielectric ceramic layers was 100, and the counter electrode area was 1.4 mm per layer.

Sample No. 5

A monolithic ceramic capacitor of Sample No. 5 was produced by the same production method as that in Sample No. 1 except that the classification treatment was not conducted.

Sample No. 6

A monolithic ceramic capacitor of Sample No. 6 was produced by the same production method as that in Sample No. 3 except that the classification treatment was not conducted.

Sample No. 7

A monolithic ceramic capacitor of Sample No. 7 was produced by the same production method as that in Sample No. 2 except that $CaCO_3$ in addition to $BaCO_3$ and $TiO_2$ was prepared as the ceramic raw material, and these ceramic raw materials were weighed in such a way that the primary component composition became $(Ba_{0.95}Ca_{0.05})_{1.008}TiO_3$.

Sample No. 8

A monolithic ceramic capacitor of Sample No. 8 was produced by the same production method as that in Sample No. 2 except that $CaCO_3$ in addition to $BaCO_3$ and $TiO_2$ was prepared as the ceramic raw material, these ceramic raw materials were weighed in such a way that the primary component composition became $(Ba_{0.95}Ca_{0.05})_{1.008}TiO_3$, and after the disintegration treatment, the classification treatment was not conducted.

Analysis of Ceramic Microstructure

Cross-sections of monolithic ceramic capacitors of Sample Nos. 1 to 8 were observed with TEM (transmission electron microscope), secondary components were subjected to mapping analysis on the basis of EDX (energy dispersion X-ray spectroscopy), and the cross-sectional area ratios of the solid solution regions of the secondary components in the main phase grains were determined.

Specifically, in the case where 0.2 parts by mole or more of secondary components in total were detected in main phase grains relative to 100 parts by mole of primary component, it was determined that the secondary components formed solid solutions with the primary component. In the case where the secondary components were less than 0.2 parts by mole relative to 100 parts by mole of primary component, it was determined that the secondary components did not form solid solutions with the primary component. Then, solid solution regions and non-solid solution regions of the secondary components in the main phase grains were identified as described above, and the cross-sectional area ratios of the solid solution regions of the secondary components in the main phase grains (solid solution area ratio) was determined. In this regard, the probe diameter of the electron beam was set at 2 nm.

The solid solution area ratios of each of 20 main phase grains was determined and an average value thereof was calculated.

Table 1 shows the compositions, the production conditions, and the solid solution area ratios (average values) of the secondary components of Sample Nos. 1 to 8.

TABLE 1

Composition: $100A_mBO_3 + 0.7DyO_{3/2} + 1.4MgO + 0.2MnO + 1.0SiO_2$

| Sample No. | $A_mBO_3$ | Disintegration time | Classification treatment | Solid solution area ratio of secondary components |
|---|---|---|---|---|
| 1 | $Ba_{1.008}TiO_3$ | 8 | Yes | 0 |
| 2 | $Ba_{1.008}TiO_3$ | 12 | Yes | 3 |
| 3 | $Ba_{1.008}TiO_3$ | 16 | Yes | 8 |
| 4 | $Ba_{1.008}TiO_3$ | 18 | Yes | 10 |
| 5* | $Ba_{1.008}TiO_3$ | 8 | None | 21 |
| 6* | $Ba_{1.008}TiO_3$ | 16 | None | 43 |
| 7* | $(Ba_{0.95}Ca_{0.05})_{1.008}TiO_3$ | 12 | Yes | 4 |
| 8* | $(Ba_{0.95}Ca_{0.05})_{1.008}TiO_3$ | 12 | None | 22 |

*asterisked sample numbers indicate samples which are out of the present invention Regarding Sample Nos. 1 to 4, the classification treatment was conducted after the disintegration. Therefore, very fine $Ba_{1.008}TiO_3$ particles were removed from the primary component as much as possible. Consequently, it was made clear that the solid solution area ratio of the secondary components was able to be reduced to 10% or less.

Regarding Sample Nos. 5 and 6, the classification treatment was not conducted after the disintegration. Therefore, large amounts of very fine $Ba_{1.008}TiO_3$ particles were present in the primary component. Consequently, it was made clear that the solid solution area ratio of the secondary components exceeded 10%. That is, since the classification treatment was not conducted after the disintegration, very fine $Ba_{1.008}TiO_3$ particles reacted with the secondary components and, as a result, an increase in solid solution area ratio of the secondary components was realized.

Regarding Sample No. 7, as in Sample Nos. 1 to 4, very fine $(Ba_{0.95}Ca_{0.05})_{1.008}TiO_3$ particles were removed from the primary component and, as a result, the solid solution area ratio of the secondary components was reduced to 4%. However, the primary component contained Ca.

Regarding Sample No. 8, the classification treatment was not conducted after the disintegration. Therefore, large amounts of very fine $(Ba_{0.95}Ca_{0.05})_{1.008}TiO_3$ particles were present in the primary component. Consequently, it was made clear that the solid solution area ratio of the secondary components was 22% and, therefore, exceeded 10% from the same reason as that for Sample Nos. 5 and 6.

Characteristic Evaluation

The dielectric constant $\in$, the dielectric loss tan δ, the AC voltage characteristic of capacitance, the temperature characteristic, and the reliability were evaluated.

That is, the capacitance C and the dielectric loss tan δ were measured by using an automatic bridge type measuring instrument under the condition of a frequency of 1 kHz, an effective voltage of 0.5 Vrms, and a temperature of 25° C., and the dielectric constant $\in$ was calculated from the capacitance C. Thereafter, the evaluation was conducted on the assumption that a good product had a dielectric constant of 2,500 or more and a dielectric loss tan δ of less than 5%.

Regarding the AC voltage characteristic, the capacitances $C_{0.5V}$ and $C_{0.1V}$ at an effective voltages of 0.5 Vrms and 0.1 Vrms were measured under the condition of a frequency of 1 kHz and a temperature of 25° C. Thereafter, the capacitances $C_{0.5V}$ at 0.5 Vrms was employed as the reference, and the rate of change in capacitance with respect to the voltage $\Delta C_{0.1V}/C_{0.5V}$ at 0.1 Vrms was determined. The AC voltage characteristic of the capacitance was evaluated on the assumption that a good product had a rate of change in capacitance with respect to the voltage $\Delta C_{0.1V}/C_{0.5V}$ within the range of ±10%.

Regarding the temperature characteristic, the capacitance at +25° C. was employed as the reference, and the rate of change in capacitance with respect to the temperature ($\Delta C/C_{25}$) at −55° C. to +85° C. was measured. Thereafter, the temperature characteristic of the capacitance was evaluated on the assumption that a good product had a rate of change with respect to the temperature ($\Delta C/C_{25}$) within the range of ±10%.

Regarding reliability, a high-temperature load test was conducted and the evaluation was conducted on the basis of the high-temperature load life. That is, a direct current voltage of 6.3 V was applied to each of 100 samples at a high temperature of 85° C., and there change in insulation resistance with time was measured. Test pieces exhibiting insulation resistances decreased to 200 kΩ or less after a lapse of 1,000 hours or after a lapse of 2,000 hours from the starting of the test were assumed to be defectives, the number of the defectives was counted and, thereby, the high-temperature load life, that is, the reliability, was evaluated.

Table 2 shows the individual measurement results of Sample Nos. 1 to 8.

TABLE 2

| Sample No. | Dielectric constant $\in$ (—) | Dielectric loss tanδ (%) | Rate of change in capacitance with respect to voltage $\Delta C_{0.1V}/C_{0.5V}$ (%) | Rate of change in capacitance with respect to temperature $\Delta C/C_{25}$ (%) | High-temperature load test the number of defectives 1000 hours | 2000 hours |
|---|---|---|---|---|---|---|
| 1 | 3150 | 2.8 | −5.9 | −6.7 | 0/100 | 0/100 |
| 2 | 3050 | 2.6 | −6.2 | −7.8 | 0/100 | 0/100 |
| 3 | 2800 | 2.4 | −6.6 | −8.7 | 0/100 | 0/100 |
| 4 | 2720 | 2.3 | −6.8 | −9.2 | 0/100 | 0/100 |
| 5* | 2820 | 2.2 | −10.2 | −8.8 | 0/100 | 0/100 |
| 6* | 3120 | 2.1 | −11.5 | −7.6 | 0/100 | 0/100 |
| 7* | 2950 | 2.8 | −10.8 | −7.2 | 0/100 | 0/100 |
| 8* | 2750 | 2.6 | −11.0 | −8.0 | 0/100 | 0/100 |

*asterisked sample numbers indicate samples which are out of the present invention As is clear from Table 1 and Table 2, the solid solution area ratio of the secondary components in Sample No. 5 was 21%, thus and exceeding 10%. The rate of change in capacitance with respect to the voltage $\Delta C_{0.1V}/C_{0.5V}$ was not reduced to within ±10% and it was made clear that the capacitance became unstable toward voltage fluctuation.

Regarding Sample No. 6, the solid solution area ratio of the secondary components was 43%, i.e., they exceeded 10%. Therefore, as in Sample No. 5, the rate of change in capacitance with respect to the voltage $\Delta C_{0.1V}/C_{0.5V}$ was not reduced to within ±10% and it was clear that the capacitance became unstable toward voltage fluctuation.

Regarding Sample No. 7, the solid solution area ratio of the secondary components was 4%, i.e., 10% or less. However, since Ca was contained in the primary component, the rate of change in capacitance with respect to the voltage $\Delta C_{0.1V}/C_{0.5V}$ was not able reduced to within 10% and it was clear that the capacitance became unstable toward voltage fluctuation. That is, it was ascertained that in the case where Ca was contained in the primary component, even when the solid solution area ratio of the secondary components was specified to be 10% or less, the AC voltage characteristic was not able to be improved.

Regarding Sample No. 8, the solid solution area ratio of the secondary components was 22%, i.e., it exceeded 10%. Furthermore, Ca was contained in the primary component. Therefore, the rate of change in capacitance with respect to the voltage $\Delta C_{0.1V}/C_{0.5V}$ was not reduced to within ±10% and it was clear that the capacitance became unstable toward voltage fluctuation.

Consequently, it was ascertained that in order to obtain a good AC voltage characteristic, a reduction of the solid solution regions of the secondary components in the primary phase grains, that is, the solid solution area ratio, to 10% or less was necessary and no containment of Ca in the primary component was important.

Example 2

In Example 2, monolithic ceramic capacitors of Sample Nos. 11 to 40 were produced, in which the amounts of blend of individual components constituting the dielectric ceramics were different, and the dielectric characteristic, the AC voltage characteristic, the temperature characteristic, and the reliability were evaluated.

That is, $BaCO_3$ and $TiO_2$ were prepared as ceramic raw materials. These ceramic raw materials were weighed in such a way that the blend molar ratio m of Ba to Ti became 0.995 to 1.032.

Subsequently, a calcined powder having an average particle diameter of 0.2 μm was produced in the same manner and procedure as those in Example 1 and, thereafter, the calcined powder was put into the ball mill together with small diameter PSZ balls having a diameter of 0.1 mm and pure water. A wet disintegration treatment was conducted for 12 minutes so as to obtain a slurry. Then, the resulting slurry was subjected to a classification treatment by using a nonwoven fabric filter so as to obtain a slurry from which very fine barium titanate particles had been removed as much as possible, and this was dried so as to obtain a primary component powder.

Thereafter, an R oxide containing the first additive element R ($La_2O_3$, $CeO_2$, $Pr_6O_{11}$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$, and $Y_2O_3$), an M oxide containing the second additive element M ($MnO$, $Fe_2O_3$, $CoO$, $V_2O_5$, $WO_3$, $Cr_2O_3$, $MoO_2$, $CuO$, $Al_2O_3$, and $MgO$), and $SiO_2$ were prepared.

These secondary component materials were weighed in such a way that the following general formula (C) of the dielectric ceramic was satisfied.

$$100Ba_mTiO_3 + aRO_n + bMO_v + cSiO_2 \quad (C)$$

Subsequently, these secondary component materials were mixed with the above-described primary component powder in the ball mill and, thereafter, vaporization and drying were conducted, so as to obtain a ceramic raw material powder.

Then, the monolithic ceramic capacitors of Sample Nos. 11 to 40 were produced by the same production method as that in Example 1.

Next, as in Example 1, analysis of the ceramic microstructure was conducted by using TEM-EDX, and the solid solution area ratio of the secondary components was measured. As a result, it was ascertained that all samples exhibited 10% or less. That is, in the present Example 2, the classification treatment was conducted after the disintegration and, thereby, very fine barium titanate particles were removed from the primary component as much as possible. Consequently, the reactions between the primary component and the secondary components were not facilitated and, thereby, the solid solution area ratio was reduced to 10% or less. Therefore, it was made clear that the solid solution area ratio was able to be reduced to 10% or less without being affected by the amounts of addition of the secondary components by removing very fine barium titanate particles from the primary component powder.

Subsequently, regarding each sample of Sample Nos. 11 to 40, the dielectric constant $\in$, the dielectric loss tan δ, the rate of change in capacitance with respect to the voltage $\Delta C_{0.1V}/C_{0.5V}$, the rate of change in capacitance with respect to the temperature $\Delta C/C_{25}$, and the high-temperature load test were conducted and the individual characteristics were evaluated in the same manner and procedure as those in Example 1.

Table 3 shows the component compositions of Sample Nos. 11 to 40, and Table 4 shows the measurement results of the individual characteristics. In both tables, asterisked sample numbers indicate samples which are out of the present invention.

TABLE 3

| | Composition: $100Ba_mTiO_3 + aRO_n + bMO_v + cSiO_2$ | | | | | |
|---|---|---|---|---|---|---|
| Sample No. | m | R | a | M | b | c |
| 11 | 1.010 | Dy | 1.0 | Mg/Mn | 1.2(1.0/0.2) | 1.0 |
| 12 | 1.012 | Y/Dy | 1.0(0.8/0.2) | Mn/V/Mg | 1.2(0.05/0.15/1.0) | 1.3 |
| 13 | 1.022 | Y | 1.0 | V/Mg | 1.2(0.2/1.0) | 2.5 |
| 14 | 1.009 | Dy | 1.0 | Mn/Mg | 0.5(0.4/0.1) | 1.3 |
| 15 | 1.007 | Eu | 0.7 | Fe/V/Mg | 1.2(0.4/0.1/0.7) | 0.7 |
| 16 | 1.006 | Pr/Er | 0.9(0.4/0.5) | Ni/V | 1.0(0.5/0.5) | 0.5 |
| 17 | 0.998 | Ce/Nd | 1.0(0.2/0.8) | Ni/Fe/Mg | 1.6(0.2/0.2/1.2) | 0.1 |
| 18 | 1.011 | Dy/Er | 1.3(0.2/1.1) | W/Fe/Mg | 2.8(1.2/0.3/1.3) | 0.6 |
| 19 | 1.020 | Pr/Nd | 1.0(0.3/0.7) | Cr/Al/Mg | 1.4(0.1/0.4/0.9) | 2.0 |
| 20 | 1.010 | Er | 0.1 | Al/Cr/Mg | 0.9(0.1/0.3/0.5) | 1.2 |
| 21 | 1.024 | Ce/Sm | 0.8(0.3/0.5) | Ni/W/Mg | 2.0(0.2/0.8/1.0) | 2.9 |
| 22 | 1.006 | Nd/Y | 2.0(1.0/1.0) | Mn/Mg | 1.5(1.0/0.5) | 0.9 |
| 23 | 1.002 | La/Gd | 1.2(0.3/0.9) | Al/Mg | 0.4(0.1/0.3) | 1.2 |
| 24 | 1.010 | Nd/Sm | 1.8(0.2/1.6) | Mo/Mg | 1.5(0.3/1.2) | 4.5 |

TABLE 3-continued

Composition: $100Ba_mTiO_3 + aRO_n + bMO_v + cSiO_2$

| Sample No. | m | R | a | M | b | c |
|---|---|---|---|---|---|---|
| 25 | 0.995 | Tb/Ho | 1.3(0.4/0.9) | Mn/Al/Mg | 1.2(0.2/0.2/0.8) | 0.2 |
| 26 | 1.006 | Tm/Y | 0.2(0.1/0.1) | Mg | 0.1 | 0.9 |
| 27 | 1.020 | Ho/Eu/Y | 1.2(0.2/0.3/0.7) | Mn/Mo/Mg | 3.0(0.3/1.3/1.4) | 3.9 |
| 28 | 1.001 | Ce/Lu | 0.7(0.4/0.3) | Mn/Ni/Mg | 1.8(0.2/0.1/1.5) | 0.8 |
| 29 | 1.030 | Dy/Lu | 0.3(0.1/0.2) | Mo/Mg | 1.1(0.2/0.9) | 3.5 |
| 30 | 1.005 | Y/Ho | 1.4(0.5/0.9) | Mn/Co/Mg | 1.5(0.1/0.3/1.1) | 1.2 |
| 31 | 1.028 | Lu/Dy | 0.5(0.2/0.3) | V/Mg | 1.6(0.2/1.4) | 5.0 |
| 32 | 1.012 | La/Ce | 1.2(0.2/1.0) | W/Ni/Mg | 2.2(1.0/0.7/0.5) | 1.2 |
| 33* | 0.950 | Eu/Pr | 0.5(0.2/0.3) | Mn/V/Mg | 1.6(0.2/0.2/1.2) | 1.9 |
| 34* | 1.032 | Yb/Y | 1.0(0.5/0.5) | Mn/Mg | 1.3/(0.3/1.0) | 1.2 |
| 35* | 1.006 | — | 0.0 | Al/Mo/Mg | 0.4(0.1/0.2/0.1) | 1.8 |
| 36* | 0.998 | La/Ho/Y | 2.3(1.0/0.8/0.5) | Mn/Mo/Mg | 1.8(0.4/0.3/1.1) | 1.8 |
| 37* | 0.999 | La/Pr | 1.3(0.3/1.0) | — | 0.0 | 1.4 |
| 38* | 1.012 | Tm/Yb | 1.3(0.2/1.1) | Fe/Mn/Mg | 3.2(0.2/1.5/1.5) | 0.3 |
| 39* | 1.010 | Lu/Y | 1.0(0.5/0.5) | Ni/Cr/Mg | 1.3(0.2/0.3/0.8) | 0.0 |
| 40* | 1.026 | Dy/Eu | 1.2(0.5/0.7) | Cr/Mg | 1.3(0.3/1.0) | 5.2 |

TABLE 4

| Sample No. | Dielectric constant ϵ (—) | Dielectric loss tan δ (%) | Rate of change in capacitance with respect to voltage $\Delta C_{0.1v}/C_{0.5v}$ (%) | Rate of change in capacitance with respect to temperature $\Delta C/C_{25}$ (%) | High-temperature load test the number of defectives | |
|---|---|---|---|---|---|---|
| | | | | | 1000 hours | 2000 hours |
| 11 | 3180 | 2.8 | −7.6 | −7.1 | 0/100 | 0/100 |
| 12 | 3170 | 2.8 | −7.5 | −7.2 | 0/100 | 0/100 |
| 13 | 3050 | 2.5 | −7.1 | −7.6 | 0/100 | 0/100 |
| 14 | 3350 | 3.1 | −8.2 | −6.5 | 0/100 | 0/100 |
| 15 | 3170 | 2.8 | −7.5 | −6.8 | 0/100 | 0/100 |
| 16 | 3220 | 2.9 | −7.7 | −6.9 | 0/100 | 0/100 |
| 17 | 3480 | 3.4 | −8.8 | −5.9 | 0/100 | 0/100 |
| 18 | 2750 | 2.1 | −6.2 | −8.9 | 0/100 | 0/100 |
| 19 | 2980 | 2.4 | −6.9 | −7.8 | 0/100 | 0/100 |
| 20 | 3060 | 2.6 | −7.1 | −6.4 | 0/100 | 0/100 |
| 21 | 2590 | 1.9 | −5.8 | −8.6 | 0/100 | 0/100 |
| 22 | 3210 | 2.8 | −7.7 | −8.3 | 0/100 | 0/100 |
| 23 | 3450 | 3.3 | −8.7 | −6.3 | 0/100 | 0/100 |
| 24 | 2690 | 2.0 | −6.1 | −9.7 | 0/100 | 0/100 |
| 25 | 3490 | 3.4 | −8.9 | −6.2 | 0/100 | 0/100 |
| 26 | 3200 | 2.8 | −7.6 | −6.0 | 0/100 | 0/100 |
| 27 | 3430 | 3.3 | −8.6 | −6.4 | 0/100 | 0/100 |
| 28 | 3480 | 3.4 | −8.8 | −5.5 | 0/100 | 0/100 |
| 29 | 2790 | 2.2 | −6.3 | −7.5 | 0/100 | 0/100 |
| 30 | 3110 | 2.7 | −7.3 | −7.9 | 0/100 | 0/100 |
| 31 | 3380 | 3.2 | −8.4 | −5.7 | 0/100 | 0/100 |
| 32 | 3020 | 2.5 | −7.0 | −8.0 | 0/100 | 0/100 |
| 33* | 4580 | 7.2 | −9.4 | 2.3 | 10/100 | 15/100 |
| 34* | 2200 | 1.6 | −5.2 | −9.5 | 0/100 | 0/100 |
| 35* | 4150 | 5.4 | −9.8 | −0.6 | 4/100 | 12/100 |
| 36* | 2040 | 1.5 | −5.0 | −11.4 | 0/100 | 0/100 |
| 37* | 4100 | 5.2 | −9.5 | −2.6 | 6/100 | 11/100 |
| 38* | 2180 | 1.6 | −5.2 | −10.3 | 0/100 | 0/100 |
| 39* | 1930 | 1.4 | −4.9 | −12.0 | 1/100 | 5/100 |
| 40* | 4150 | 5.4 | −9.8 | −2.1 | 2/100 | 6/100 |

Regarding Sample No. 33, the blend molar ratio m of the Ba site to the Ti site was 0.950, i.e., less than 0.995. Therefore, the Ti site was too excessive, and the dielectric loss tan δ became 7.2%, i.e., it exceeded 5%. Furthermore, in the high-temperature load test, the number of defectives was 10/100 after a lapse of 1,000 hours and 15/100 after a lapse of 2,000 hours. Consequently, it was clear that deterioration of the reliability had occurred.

Regarding Sample No. 34, the blend molar ratio m of the Ba site to the Ti site was 1.032, i.e., it and exceeded 1.030. Therefore, it was made clear that since the Ba site was too excessive, the dielectric constant ∈ was reduced to 2,200.

Regarding Sample No. 35, the first additive element R was not present in the dielectric ceramic at all and, therefore, the dielectric loss tan δ became 5.4%, i.e., it exceeded 5%. Furthermore, in the high-temperature load test, the number of defectives was 4/100 after a lapse of 1,000 hours and 12/100 after a lapse of 2,000 hours. Consequently, it was clear that a deterioration of the reliability was present.

Regarding Sample No. 36, the total content of the first additive element R was 2.3 parts by mole relative to 100 parts by mole of the primary component, i.e., exceeding 2.0 parts by mole, and, thereby, the dielectric constant ∈ was reduced to 2,040. Furthermore, it was clear that the rate of change in capacitance with respect to the temperature $\Delta C/C_{25}$ was −11.4% and was not able to be reduced to be within ±10%, the capacitance became unstable toward temperature change, and the temperature characteristic deteriorated.

Regarding Sample No. 37, the second additive element M was not present in the dielectric ceramic at all and, therefore, the dielectric loss tan δ was 5.2%, i.e., it exceeded 5%. Furthermore, in the high-temperature load test, the number of defectives was 6/100 after a lapse of 1,000 hours and 11/100 after a lapse of 2,000 hours. Consequently, it was clear that a deterioration of the reliability was present.

Regarding Sample No. 38, the total content of the second additive element M was 3.2 parts by mole relative to 100 parts by mole of the primary component, so that it exceeded 3.0 parts by mole and, thereby, the dielectric constant ∈ was reduced to 2,180. Furthermore, it was made clear that the rate of change in capacitance with respect to the temperature $\Delta C/C_{25}$ was −10.3 and was not able to be reduced within ±10%, and the temperature characteristic deteriorated.

Regarding Sample No. 39, Si which performs a function as a sintering aid was not present in the dielectric ceramic at all and, therefore, sufficient dielectric characteristic and temperature characteristic were not able to be obtained under the firing condition of 1,200° C. and 2 hours, the dielectric constant ∈ was a low 1,930, and the rate of change in capacitance with respect to the temperature $\Delta C/C_{25}$ was −12.0%. Furthermore, in the high-temperature load test, the number of defectives was 1/100 after a lapse of 1,000 hours and 5/100 after a lapse of 2,000 hours. Consequently, it was made clear that a deterioration of the reliability was present.

Regarding Sample No. 40, the content of $SiO_2$ was 5.2 parts by mole relative to 100 parts by mole of the primary component, thereby exceeding 5.0 parts by mole and, thereby, the dielectric loss tan δ became 5.4%, i.e., it exceeded 5%. Furthermore, in the high-temperature load test, the number of defectives was 2/100 after a lapse of 1,000 hours and 6/100 after a lapse of 2,000 hours. Consequently, it was clear that deterioration of the reliability was present.

On the other hand, regarding Sample Nos. 11 to 32, the blend molar ratio m, the parts by mole a, b, and c of the individual additive elements relative to 100 parts by mole of primary component satisfy $0.995 \leq m \leq 1.030$, $0.1 \leq a \leq 2.0$, $0.1 \leq b \leq 3.0$, and $0.1 \leq c \leq 5.0$, respectively, and therefore, were within the preferable ranges of the present invention. In addition, the solid solution area ratios of the secondary components were 10% or less. Consequently, the dielectric constant ∈ were 2,500 or more, the dielectric losses tan δ were less than 5%, the rates of change in capacitance with respect to the voltage $\Delta C_{0.1V}/C_{0.5V}$ were within ±10%, and the rates of change in capacitance with respect to the temperature $\Delta C/C_{25}$ were within ±10%. Furthermore, in the high-temperature load test, the number of defectives was 0/100 after a lapse of 2,000 hours. That is, it was clear that a monolithic ceramic capacitor excellent in not only the AC voltage characteristic, but also the dielectric characteristic, the temperature characteristic, and the reliability was able to be realized by specifying the blend molar ratio m and the parts by mole a, b, and c of the individual additive elements within the preferable ranges of the present invention.

Example 3

A primary component powder, from which very fine $Ba_{1.008}TiO_3$ particles had been removed as much as possible, was produced by the same production method as that of Sample No. 2 in Example 1.

Subsequently, $SiO_2$, $Li_2O$, $B_2O_3$, $NaO$, $Al_2O_3$, $MgO$, $BaO$, $K_2O$, $SrO$, $GaO$, $TiO_2$, and $ZrO_2$, which were X oxides containing the sintering aid component X, besides $Dy_2O_3$, $MgO$, and $MnO$ were prepared as the secondary component materials.

Then, these secondary component materials were weighed in such a way that the dielectric ceramic satisfy the following general formula (D).

$$100Ba_{1.008}TiO_3 + 0.7DyO_{3/2} + 1.4MgO + 0.2MnO + cXO_w \quad (D)$$

Next, these secondary component materials were mixed with the above-described primary component powder in the ball mill and, thereafter, vaporization and drying were conducted, so as to obtain a ceramic raw material powder.

Subsequently, the monolithic ceramic capacitors of Sample Nos. 51 to 63 were produced by the same production method as that in Example 1.

Then, as in Example 1, analysis of the ceramic microstructure was conducted by using TEM-EDX, and the solid solution area ratio of the secondary components was measured. As a result, it was ascertained that all samples exhibited 10% or less as in Example 1 and Example 2.

Next, regarding each sample of Sample Nos. 51 to 63, the dielectric constant ∈, the dielectric loss tan δ, the rate of change in capacitance with respect to the voltage $\Delta C_{0.1V}/C_{0.5V}$, the rate of change in capacitance with respect to the temperature $\Delta C/C_{25}$, and the high-temperature load test were conducted and the individual characteristics were evaluated in the same manner and procedure as those in Example 1.

Table 5 shows the component type and the molar content (parts by mole) relative to 100 parts by mole of the primary component of the sintering aid component X in Sample Nos. 51 to 63, and Table 6 shows the measurement results of the individual characteristics.

TABLE 5

| Sample No. | Composition: $100Ba_{1.008}TiO_3 + 0.7DyO_{3/2} + 1.4MgO + 0.2MnO + cXO_w$ | |
|---|---|---|
| | X | c |
| 51 | Si | 1.0 |
| 52 | Si/Ti | 0.5(0.25/0.25) |
| 53 | Si/Li | 1.3(1.0/0.3) |
| 54 | Si/Li/Na | 2.9(2.1/0.4/0.4) |
| 55 | Si/Li/B | 3.6(2.0/1.0/0.6) |
| 56 | Si/Li/B | 0.6(0.3/0.1/0.2) |
| 57 | Si/B | 0.1(0.05/0.05) |
| 58 | Si/Zr/Al | 5.0(4.0/0.5/0.5) |
| 59 | Si/B/Ga | 1.0(0.8/0.1/0.1) |
| 60 | Si/B/K | 2.3(1.5/0.5/0.3) |
| 61 | Si/Mg | 0.3(0.2/0.1) |
| 62 | Si/Zr | 1.2(1.0/0.2) |
| 63 | Si/Ba/Sr | 4.5(2.0/2.0/0.5) |

TABLE 6

| Sample No. | Dielectric constant ϵ (—) | Dielectric loss tanδ (%) | Rate of change in capacitance with respect to voltage $\Delta C_{0.1V}/C_{0.5V}$ (%) | Rate of change in capacitance with respect to temperature $\Delta C/C_{25}$ (%) | High-temperature load test the number of defectives 1000 hours | 2000 hours |
|---|---|---|---|---|---|---|
| 51 | 3180 | 2.8 | −7.6 | −8.1 | 0/100 | 0/100 |
| 52 | 3080 | 2.6 | −7.2 | −8.5 | 0/100 | 0/100 |
| 53 | 3230 | 2.9 | −7.8 | −7.9 | 0/100 | 0/100 |
| 54 | 3550 | 3.6 | −9.2 | −6.5 | 0/100 | 0/100 |
| 55 | 3680 | 3.9 | −9.8 | −5.9 | 0/100 | 0/100 |
| 56 | 3100 | 2.6 | −7.3 | −8.4 | 0/100 | 0/100 |
| 57 | 3000 | 2.5 | −6.9 | −8.8 | 0/100 | 0/100 |
| 58 | 3690 | 3.9 | −9.9 | −5.8 | 0/100 | 0/100 |
| 59 | 3180 | 2.8 | −7.6 | −8.1 | 0/100 | 0/100 |
| 60 | 3430 | 3.3 | −8.6 | −7.1 | 0/100 | 0/100 |
| 61 | 3040 | 2.5 | −7.1 | −8.6 | 0/100 | 0/100 |
| 62 | 3210 | 2.8 | −7.7 | −8.0 | 0/100 | 0/100 |
| 63 | 3580 | 3.7 | −9.3 | −6.4 | 0/100 | 0/100 |

As is clear from Table 5 and Table 6, even in the case when sintering aids composed of combinations rather than just Si were used, the dielectric constants ϵ were 2,500 or more, the dielectric losses tan δ were less than 5%, the rates of change in capacitance with respect to the voltage $\Delta C_{0.1V}/C_{0.5V}$ were within ±10%, and the rates of change in capacitance with respect to the temperature $\Delta C/C_{25}$ were within ±10%. Furthermore, in the high-temperature load test, the number of defectives was 0 after a lapse of 2,000 hours. That is, it was clear that the monolithic ceramic capacitor is excellent in not only the AC voltage characteristic, but also the dielectric characteristic, the temperature characteristic, and the reliability was able to be realized by specifying the solid solution area ratio of the secondary components within 10%, specifying the blend molar ratio m and the parts by mole a, b, and c of the individual additive elements within the preferable ranges of the present invention, and containing at least Si as the sintering aid component X, even when other sintering aid components are contained.

Example 4

The monolithic ceramic capacitors of Examples 71 to 77 were produced by the same production method as that of Sample No. 2 in Example 1 except that specific impurity components shown in Table 7 were contained by predetermined parts by mole relative to 100 parts by mole of primary component.

TABLE 7

| Sample No. | Impurity component | Parts by mole relative to 100 parts by mole of primary component |
|---|---|---|
| 71 | Zr/Ag | 0.45(0.4/0.05) |
| 72 | Zr/Zn | 0.27(0.25/0.02) |
| 73 | Zr/Hf/Ag | 0.18(0.1/0.07/0.01) |
| 74 | Zr/Ni/Sr | 0.65(0.5/0.05/0.1) |
| 75 | Zr/Zn | 0.3(0.2/0.1) |
| 76 | Zr/Hf/Pd | 0.54(0.5/0.02/0.02) |
| 77 | Ni/Zn/Na | 0.44(0.4/0.01/0.03) |

In Example 4 as well, as in Example 1, analysis of the ceramic microstructure was conducted by using TEM-EDX, and the solid solution area ratio of the secondary components was measured. As a result, it was ascertained that all samples exhibited 10% or less as in each of Examples 1 to 3 described above.

Next, regarding each sample of Sample Nos. 71 to 77, the dielectric constant ϵ, the dielectric loss tan δ, the rate of change in capacitance with respect to the voltage $\Delta C_{0.1V}/C_{0.5V}$, the rate of change in capacitance with respect to the temperature $\Delta C/C_{25}$, and the high-temperature load test were conducted and the individual characteristics were evaluated in the same manner and procedure as those in Example 1.

Table 8 shows the measurement results thereof.

TABLE 8

| Sample No. | Dielectric constant ϵ (—) | Dielectric loss tanδ (%) | Rate of change in capacitance with respect to voltage $\Delta C_{0.1V}/C_{0.5V}$ (%) | Rate of change in capacitance with respect to temperature $\Delta C/C_{25}$ (%) | High-temperature load test the number of defectives 1000 hours | 2000 hours |
|---|---|---|---|---|---|---|
| 71 | 3060 | 2.6 | −7.1 | −8.6 | 0/100 | 0/100 |
| 72 | 3220 | 2.9 | −7.7 | −8.0 | 0/100 | 0/100 |
| 73 | 3090 | 2.6 | −7.2 | −8.5 | 0/100 | 0/100 |
| 74 | 3470 | 3.4 | −8.8 | −6.9 | 0/100 | 0/100 |
| 75 | 3290 | 3.0 | −8.0 | −7.7 | 0/100 | 0/100 |
| 76 | 3170 | 2.8 | −7.5 | −8.2 | 0/100 | 0/100 |
| 77 | 3090 | 2.6 | −7.2 | −8.5 | 0/100 | 0/100 |

As is clear from Table 7 and Table 8, even in the case where very small amounts of impurities were contained in the dielectric ceramic, the dielectric constants ϵ were 2,500 or more, the dielectric losses tan δ were less than 5%, the rates of change in capacitance with respect to the voltage $\Delta C_{0.1V}/C_{0.5V}$ were within ±10%, and the rates of change in capacitance with respect to the temperature $\Delta C/C_{25}$ were within ±10%. Furthermore, in the high-temperature load test, the number of defectives was 0 after a lapse of 2,000 hours. That is, it was ascertained that a monolithic ceramic capacitor excellent in the AC voltage characteristic, the dielectric characteristic, the temperature characteristic, and the reliability was able to be realized without affecting various characteristics even when small amounts of impurities were contained in the dielectric ceramic by specifying the solid solution area ratio of the secondary components within 10%, by specifying the blend molar ratio m and the parts by mole a, b, and c of the individual additive elements within the preferable ranges of the present invention, and containing at least Si as the sintering aid component X.

The invention claimed is:

1. A dielectric ceramic characterized by comprising a composition including calcium-free barium titanate as a primary component and a first additive element R which is at least one member selected from the group consisting of La, Ce, Pr, Nd, Sm, Eu, Gd, Tb, Dy, Ho, Er, Tm, Yb, Lu, and Y, a second additive element M which is at least one member selected from the group consisting of Mn, Fe, Co, V, W, Cr, Mo, Cu, Al, and Mg, and a sintering aid component X containing at least Si as secondary components,
    wherein there are solid solution regions of the secondary components in the main phase grains and those solid solution regions are 10% or less on average in terms of a cross-sectional area ratio.

2. The dielectric ceramic according to claim 1, characterized in that the composition is represented by $100Ba_mTiO_3 + aRO_n + bMO_v + cXO_w$ where n, v, and w represent independently a positive number determined in accordance with the valences of the first additive element R, the second additive element M, and the sintering aid component X, respectively, and m, a, b, and c satisfy $0.995 \leq m \leq 1.030$, $0.1 \leq a \leq 2.0$, $0.1 \leq b \leq 3.0$, and $0.123\ c \leq 5.0$, respectively.

3. The dielectric ceramic according to claim 2, wherein $0.998 \leq m \leq 1.028$, $0.2 \leq a \leq 1.8$, $0.4 \leq b \leq 2.8$, and $0.2 \leq c \leq 4.5$.

4. The dielectric ceramic according to claim 3, wherein M comprises Mg.

5. The dielectric ceramic according to claim 4, wherein X is Si.

6. A monolithic ceramic capacitor characterized by comprising a ceramic sintered member in which dielectric layers and internal electrodes are laminated alternately, external electrodes are disposed on end portions of the ceramic sintered member and are electrically connected to the internal electrodes, wherein the dielectric layer comprises the dielectric ceramic according to claim 5.

7. In a method of making the dielectric ceramic of claim 5 in which particulate barium titanate, the first and second additive element, and the sintering aid are combined and fired, the improvement which comprises eliminating a quantity of about the smallest one tenth of the particulate barium titanate prior to the combining with the additive elements and sintering aid.

8. A monolithic ceramic capacitor characterized by comprising a ceramic sintered member in which dielectric layers and internal electrodes are laminated alternately, external electrodes are disposed on end portions of the ceramic sintered member and are electrically connected to the internal electrodes, wherein the dielectric layer comprises the dielectric ceramic according to claim 4.

9. In a method of making the dielectric ceramic of claim 4 in which particulate barium titanate, the first and second additive element, and the sintering aid are combined and fired, the improvement which comprises eliminating a quantity of about the smallest one tenth of the particulate barium titanate prior to the combining with the additive elements and sintering aid.

10. A monolithic ceramic capacitor characterized by comprising a ceramic sintered member in which dielectric layers and internal electrodes are laminated alternately, external electrodes are disposed on end portions of the ceramic sintered member and are electrically connected to the internal electrodes, wherein the dielectric layer comprises the dielectric ceramic according to claim 3.

11. In a method of making the dielectric ceramic of claim 3 in which particulate barium titanate, the first and second additive element, and the sintering aid are combined and fired, the improvement which comprises eliminating a quantity of about the smallest one tenth of the particulate barium titanate prior to the combining with the additive elements and sintering aid.

12. A monolithic ceramic capacitor characterized by comprising a ceramic sintered member in which dielectric layers and internal electrodes are laminated alternately, external electrodes are disposed on end portions of the ceramic sintered member and are electrically connected to the internal electrodes, wherein the dielectric layer comprises the dielectric ceramic according to claim 2.

13. In a method of making the dielectric ceramic of claim 2 in which particulate barium titanate, the first and second additive element, and the sintering aid are combined and fired, the improvement which comprises eliminating a quantity of about the smallest one tenth of the particulate barium titanate prior to the combining with the additive elements and sintering aid.

14. A monolithic ceramic capacitor characterized by comprising a ceramic sintered member in which dielectric layers and internal electrodes are laminated alternately, external electrodes are disposed on end portions of the ceramic sintered member and are electrically connected to the internal electrodes, wherein the dielectric layer comprises the dielectric ceramic according to claim 1.

15. In a method of making the dielectric ceramic of claim 1 in which particulate barium titanate, the first and second additive element, and the sintering aid are combined and fired, the improvement which comprises eliminating a quantity of about the smallest one tenth of the particulate barium titanate prior to the combining with the additive elements and sintering aid.

* * * * *